United States Patent Office 3,496,218
Patented Feb. 17, 1970

3,496,218
HYDROCYANATION OF OLEFINS
William Charles Drinkard, Jr., Kynlyn, Wilmington, Del., assignor to E. I. du Pont de Nemours and Company, Wilmington, Del., a corporation of Delaware
No Drawing. Continuation-in-part of application Ser. No. 510,074, Nov. 26, 1965. This application Oct. 31, 1967, Ser. No. 679,564
Int. Cl. C07c 121/04
U.S. Cl. 260—465.8    17 Claims

ABSTRACT OF THE DISCLOSURE

A process for the hydrocyanation of non-conjugated ethylenically unsaturated organic compounds using certain nickel complexes, such as a tetrakis (triaryl phosphite) nickel (O), as catalyst and an organoboron compound, such as boron triphenyl or a boronhydride or an alkali metal borohydride or quaternary ammonium borohydride, as a promoter.

CROSS REFERENCES TO RELATED APPLICATIONS

This application is a continuation-in-part of copending application Ser. No. 510,074, filed Nov. 26, 1965, by William C. Drinkard, Jr., and now abandoned.

Copending application Ser. No. 509,432, filed Nov. 23, 1965, by William C. Drinkard, Jr., and Richard V. Lindsey, Jr., relates to a process for the hydrocyanation of olefins which involves the use as catalysts of selected nickel compounds.

BACKGROUND OF THE INVENTION

It is known that the addition of hydrogen cyanide to carbon-carbon double bonds adjacent to an activating group such as a nitrile or a carboxy group proceeds with relative ease. However, the addition of hydrogen cyanide to non-activated carbon-carbon double bonds proceeds only with difficulty, if at all, and normally requires the use of high pressure of about 1,000 p.s.i. or more and high temperatures in the range of 200 to 400° C. U.S. Patent No. 2,571,099, issued on Oct. 16, 1951, to Paul Arthur, Jr., and Burt Carlton Pratt, discloses an improvement over this technique, which improvement involves the use of nickel carbonyl with or without the addition of a tertiary aryl phosphine or arsine. This process suffers from producing a relatively high percentage of undesirable polymeric products when applied to non-conjugated olefinic starting materials and a relatively poor yield in all cases. Furthermore, this process is not satisfactory for the production of adiponitrile from pentenenitriles.

SUMMARY OF THE INVENTION

The present invention is an improvement over these processes and involves the use of certain boron compounds as promoters for the reaction.

The present invention provides a hydrocyanation process which produces nitriles or dinitriles from non-conjugated olefins in high yield under mild conditions, with minimal formation of polymer and minimal use of catalyst.

The process of the present invention is generally applicable to ethylenically unsaturated organic compounds containing from 2 to 20 carbon atoms having at least one non-conjugated aliphatic carbon-carbon double bond. The 3-pentenenitriles and 4-pentenenitrile are especially preferred. Other suitable ethylenically unsaturated compounds include olefins and olefins substituted with groups which do not attack the catalyst, such as cyano. These unsaturated compounds include monoolefins containing from 2 to 20 carbons, such as ethylene, propylene, butene-1, pentene-2, hexene-2, etc.; diolefins, such as allene; and substituted compounds, such as 3-pentenenitriles and 4-pentenenitrile.

The present process offers its greatest advantage over previous processes in improved catalyst life in the production of dinitriles such as adiponitrile from either 3-pentenenitriles or 4-pentenenitrile. The total number of cycles (mole ratio of product to catalyst) obtained often depends on the impurities in the system but there is a uniform improvement obtained through the use of the promoter. When the reaction is run under optimum conditions, the number of cycles obtained can run over 100. Improved yields and reaction rates are generally also obtained through the use of promoter.

The catalysts are generally nickel compounds most of which are preferably free of carbon monoxide which may be preformed or prepared in situ and include nickel compounds containing ligands such as alkyl or aryl (either of which contain up to 18 carbon atoms), phosphines, arsines, stibines, phosphites, arsenites, stibites, and mixtures thereof.

Generally, the hydrocyanation catalysts are nickel complexes which cause the equilibration of 3-pentenenitriles and 4-pentenenitrile, which for present purposes is hereinafter referred to as the isomerization of 3-pentenenitriles to 4-pentenenitrile. These hydrocyanation/isomerization catalysts are particularly useful for the synthesis of adiponitrile and substituted adiponitriles. This property of isomerization which furnishes a convenient catalyst test may readily be ascertained by contacting pure 3-pentenenitriles with the catalyst in the presence of 1 mole of $H_2SO_4$ per mole of nickel followed by heating to 120° C. during 1 hour, and then analyzing for 4-pentenenitrile such as by gas chromatography using a 2-meter, ¼ inch outside diameter copper tube packed with 20 percent (by weight) tris(2-cyanoethoxypropane) on a 60–80 mesh (U.S. standard sieve size) firebrick. The adsorbent is maintained at 100° C. and the vaporizer at 150° C., and a helium flow of 75 ml./min. is used. A thermal conductivity detector may be employed. The relative elution time of 4-pentenenitrile is about 30 minutes. The formation of 4-pentenenitrile may be taken as indicating that the catalyst catalyzes the isomerization of 3-pentenenitriles to 4-pentenenitrile, and thus passes the test. Preferably, at least 0.5 percent of 4-pentenenitrile should be formed. The test is particularly convenient for catalysts prepared in situ by adding together a suitable nickel compound and a ligand.

An especially preferred group of these nickel compounds have the general structure

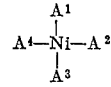

where $A^1$, $A^2$, $A^3$, and $A^4$ are neutral ligands which may be the same or different. The ligands useful in forming the catalyst here may be defined as any atoms or molecules capable of functioning as a sigma-pi bonded partner in one or more coordinate bonds. Generally, the neutral ligands are preferred such as $P(OR)_3$ where R has the meaning defined below. A description of such ligands may be found in Advanced Inorganic Chemistry by F. Albert Cotton and G. Wilkinson, published by Interscience Publishers, a division of John Wiley & Sons, 1962, Library of Congress Catalog Card No. 62–14818; particularly on pp. 602–606. Preferably, $A^1$, $A^2$, $A^3$, and $A^4$ have the structure M(XYZ) wherein M is selected from the class consisting of P, As, and Sb, and wherein X, Y, and Z may be the same or different and are selected from the class consisting of R and OR and wherein R is selected from the class consisting of alkyl and aryl groups having up to 18 carbon atoms. If desired, any of X, Y, and Z may be cojoined where possible. An especially preferred class of R's are

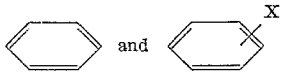

wherein X is selected from the class consisting of Cl, OCH₃, and CH₃. If desired, any of the R's may be cojoined where possible. Thus, the preferred neutral ligands of this group are the aryl phosphites such as triphenyl phosphite, tris(m&p-chlorophenyl) phospite, tris(m&p-methoxyphenyl) phospite and tris(m&p-cresyl) phosphite and mixtures thereof. It is believed that in these nickel complexes at least some of the nickel is present in the zero valent state.

Satisfactory techniques for preparing these nickel compounds may be found in French Patent 1,297,934 granted May 28, 1962, to Messrs. Reginald Francis Clark and Charles Dean Storrs and which French patent is stated to be equivalent to U.S. Patent No. 3,328,443 issued June 27, 1967. Other techniques for preparing these catalysts are described in J. Chatt and F. A. Hart, Chem. Soc. Journal (London), pp. 1378–1389 (1960) and by Lewis S. Meriwether and Marilyn L. Fiene, J. Am. Chem. Soc., 81, 4200–4209 (1959).

In many instances, it is advantageous to have an excess of certain neutral ligands present with respect to the nickel complex. The preferred excess ligands are the aryl phosphites wherein the aryl groups contain up to 18 carbon atoms. Generally, the excess ligand is present in at least a two mole excess as based on the nickel present. As used herein a two mole excess of ligand means two moles of ligand above and beyond that necessary to satisfy the valences of the nickel present. Thus, for example, when the nickel catalyst used is Ni[P(OC₆H₅)₃]₄ a total of 6 moles (4 attached to the nickel catalyst used, plus 2 moles of "excess") are actually present in the reaction mixture. The only limit of excess ligand involves practical considerations for it may even be used as the solvent. However, generally, there is little advantage to be obtained in using over a 300 mole excess of ligand as based on one mole of nickel. The preferred triaryl phosphites for use as excess ligand are triphenyl phosphite, tris(m&p-methoxyphenyl) phosphite and tris(m&p-cresyl) phosphite, and mixtures thereof.

The use of excess ligand generally may be used to control the product distribution and, hence, reduce the amount of by-products formed as well as to extend catalyst life. The excess ligand used may be the same or different from the ligand attached to nickel in the nickel compound as fed to the reactor.

There are several techniques for in situ preparation of the nickel compounds. For example, nickel carbonyl and a neutral ligand as defined above other than carbon monoxide can be added to the reaction mixture. It is preferred to wait until carbon monoxide evolution ceases before using the catalyst. Generally, all four moles of CO are replaced by another ligand such as triphenyl phosphite. A second technique involves adding the neutral ligand (as defined above) a nickel (II) compound such as a nickel halide, e.g., NiCl₂, or bis(acetylacetonato) nickel (II) and a source of hydride ions. Suitable sources of H⁻ ions are compounds of the structure M'[BH₄]ₓ, H₂, and M'Hₓ where M' is an alkali metal or an alkaline earth metal and X is a number corresponding to the valence of the metal. A third technique is to add dicyclopentadienyl nickel to a neutral ligand such as P(OR)₃ where R is an aryl radical, to the reaction mixture. In each case, the catalyst is formed under the hydrocyanation reaction conditions hereinafter described and no other special temperatures or pressures need be observed.

The improvement to which this invention is directed involves the use of a promoter to activate the catalyst.

The promoter generally is selected from the class consisting of organoboron compounds of the structure B(R')₃ and the borohydrides. The preferred borohydrides are the alkali metal borohydrides and the quaternary ammonium borohydrides particularly the tetra (lower alkyl) ammonium borohydrides and borohydrides of the formula $B_nH_{n+4}$ where $n$ is an integer of from 2 to 10, and $B_mH_{m+6}$ where $m$ is an integer of from 4 to 10. Of these, sodium borohydride and potassium borohydride are especially preferred. When the boron compounds have the structure B(R')₃, R' is selected from the class consisting of H, aryl radicals of from 6 to 18 carbon atoms, lower alkyl radicals of from 1 to 7 carbon atoms, and lower alkyl radicals of from 1 to 7 carbon atoms substituted with a cyano radical. Generally, the case where R' is phenyl or phenyl substituted with an electronegative radical is preferred. The preferred members of this class of R' have the structure

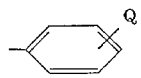

wherein —Q is selected from the class consisting of —H, —F, and CF₃. The promoter acts to improve the number of cycles and, in certain cases, the yield and rate. This is particularly evident in the hydrocyanation of 3- or 4-pentenenitrile to adiponitrile. The amount of promoter used generally can be varied from about 1:16 to 50:1 molar ratio of promoter to catalyst. The promoter may be used according to several techniques. Thus, while at least some of the promoter may be added to the reaction mixture at the start of the reaction, additional amounts may be added at any point in time during the reaction.

It is believed that the organoboron compounds of the present invention have three levels of activity as follows. First, the principal most active promoter which is believed to have the formula B(R')₃ wherein R' has the meaning defined above. Second, intermediate boron hydrides of the formula $B_nH_{n+1}$ or $B_mH_{m+6}$ which is believed, reacts with the olefin being hydrocyanated to form an organoboron compound of the formula B(R')₃ wherein R' is derived from the olefin. For example, when B₂H₆ is the borohydride and 3-pentenenitrile is the olefin the principal promoter is believed to be

and other isomers. Third, an alkali metal borohydride or quaternary ammonium borohydride which when used as the promoter is believed to form an intermediate borohydride $B_nH_{n+4}$ or $B_mH_{m+6}$ in the reaction mixture which, in turn, forms a borane B(R')₃ which becomes the principal promoter.

It is recognized that at least a part of the added boron promoter is associated with any Lewis base present in the reaction mixture. This type of interaction is discussed in Inorganic Chemistry, an advanced textbook by T. Moeller, published by John Wiley & Sons, Inc. (1952), Library of Congress Catalog Card No. 52–7487, particularly on pp. 780–781. The promoter may even be added as a preformed complex such as (C₆H₅O)₃PBH₃.

The hydrocyanation reaction may be carried out by charging a reactor with all of the reactants or preferably the reactor is charged with the catalyst, or catalyst components, the ethylenically unsaturated organic compound, the promoter and whatever solvent is to be used and the hydrogen cyanide gas is swept over the surface of the reaction mixture or bubbled through said reaction mixture. Another technique is to charge the reactor with the catalyst, promoter, hydrogen cyanide, and whatever solvent is to be used and then to feed the unsaturated compound slowly to the reaction mixture. The molar ratio of unsaturated compound to catalyst generally is varied from about 10:1 to 2000:1. In a continuous operation a much higher proportion of catalyst such as 1:5 of ethylenically unsaturated organic compound to catalyst may be fed to the reactor.

Preferably, the reaction medium is agitated, such as by stirring or shaking. The hydrocyanation product can be recovered by conventional techniques such as by distillation. The reaction may be run either batchwise or in a continuous manner.

The hydrocyanation reaction can be carried out with or without a solvent. The solvent should be liquid at the reaction temperature and pressure and inert towards the unsaturated compound and the catalyst. Generally, such solvents are hydrocarbons such as benzene or xylene, or nitriles such as acetonitrile or benzonitrile. In many cases, the ligand may serve as the solvent.

Certain ethers can be added to the reaction mixture, many of which ethers are solvents. These ethers act to produce an improved yield and generally higher cycles, particularly in the production of adiponitrile from 3-pentenenitrile or 4-pentenenitrile. This influence is generally greatest at temperatures of from about 20 to 75° C. Up to 75 volume percent of ether is used as based on the total reaction mixture. These ethers may be cyclic or acyclic and may contain from 1 to 5 ether linkages between lower alkylene radicals or arylene radicals and in the case of acyclic ethers are capped with lower alkyl groups. These ethers include dioxane, trioxane,

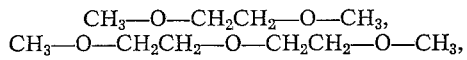

o-dimethoxybenzene, tetrahydrofuran, etc.

The exact temperature which is preferred is dependent to a certain extent on the particular catalyst being used, the particular ethylenically unsaturated compound being used and the desired rate. Generally, temperatures of from −25 to 200° C. can be used with from 0 to 150° C. being preferred.

Atmospheric pressure is satisfactory for carrying out the present invention and, hence, pressures of from about 0.05 to 10 atmospheres are preferred due to the obvious economic considerations although pressures of from 0.05 to 100 atmospheres can be used if desired.

The nitriles formed by the present invention are useful as chemical intermediates. For instance, adiponitrile is an intermediate used in the production of hexamethylene diamine which in turn is used in the production of polyhexamethylene adipamide, a commercial polyamide useful in forming fibers, films and molded articles. Other nitriles can be used to form the corresponding acids and amines which are conventional commercial products.

Unless otherwise stated, all percentages reported in the examples are by weight.

DESCRIPTION OF THE PREFERRED EMBODIMENTS

Example I

A mixture of 20 g. of 3-pentenenitrile and 2.2 g. of triphenylphosphite is charged to a 3-neck, 100 ml. glass flask fitted with a gas inlet tube over the liquid level, a gas exit through a water cooled reflux condenser, and a thermometer. The system is purged with nitrogen and 0.9 ml. of liquid nickel tetracarbonyl is added dropwise. When evolution of gas has stopped, 0.2 g. of sodium borohydride is added and the mixture is heated to 120° C. A stream of nitrogen gas is bubbled through liquid hydrogen cyanide and the resulting gas mixture is swept across the surface of the stirred hot catalyst mixture. A total of 9 ml. of liquid hydrogen cyanide is added over a 40 minute period. Gas chromatographic analysis shows that the crude liquid product contains 19.4% adiponitrile, 7.0% 2-methylglutaronitrile and 3.0% ethylsuccinonitrile.

Example II

A mixture of 20 g. of 3-pentenenitrile, 5.0 g. of Ni(CO)$_2$[P(C$_6$H$_5$)$_3$]$_2$ and 0.2 g. of sodium borohydride is charged to a 100 ml. glass flask. The system is purged with nitrogen gas and heated to 120° C. Hydrogen cyanide gas is swept across the hot reaction mixture by a nitrogen carrier gas. A total of 6.3 g. of hydrogen cyanide is added over a 40 minute period. An exothermic reaction occurs so that the temperature of the reaction remains 3° C. above the surrounding bath. Gas chromatographic analysis shows that the crude liquid contains 28.5% adiponitrile, 5.0% 2-methylglutaronitrile and 1.6% ethylsuccinonitrile.

Example III

A mixture of 20 g. of 3-pentenenitrile, 0.9 ml. of nickel tetracarbonyl and 0.2 g. of sodium borohydride is charged to a 100 ml. glass flask. The system is purged with nitrogen and hydrogen cyanide gas is swept over the reaction mixture. The temperature of the reaction rises 20 to 32° C., and then gradually drops. A total of 6.3 g. of liquid hydrogen cyanide is added over a period of one hour. Gas chromatographic analysis shows that the crude liquid product contains 0.2% adiponitrile, 0.5% 2-methylglutaronitrile and 0.3% ethylsuccinonitrile.

Example IV

A mixture of 5.0 g. of Ni(CO)$_2$[As(C$_6$H$_5$)$_3$]$_2$, 20 g. of charged to a 100 ml. glass flask, purged with nitrogen, and heated to 120° C. Hydrogen cyanide gas is swept across the hot reaction mixture by a nitrogen carrier gas. A total of 5 ml. of liquid hydrogen cyanide is added over a one-hour period. Gas chromatographic analysis of the crude liquid shows that it contains 11.4% adiponitrile and 7.6% 2-methylglutaronitrile.

Example V

A mixture of 5.0 g. of Ni[P(OC$_2$H$_5$)$_3$]$_4$, 0.2 g. of sodium borohydride and 20 ml. of m-xylene is charged to a 100 ml. glass reaction flask and purged with nitrogen. The mixture is heated to 120° C. Butadiene gas is bubbled through liquid hydrogen cyanide and the resulting mixture of gases is swept over the hot catalyst solution. A total of 4 ml. of liquid hydrogen cyanide is added. At this point, gas chromatographic analysis shows that the crude liquid contains 0.1% adiponitrile, 3.3% 2-methylglutaronitrile, 6% 2-methyl-2-butenenitrile, 5% 2-methyl-3-butenenitrile, 14% 3-pentenenitrile, and 1% 4-pentenenitrile.

As this point, butadiene flow is stopped and an additional 12 ml. of liquid hydrogen cyanide is swept into the system in a nitrogen carrier gas. Gas chromatographic analysis shows that the resulting crude liquid contains 1.4% adiponitrile, 7.4% 2-methylglutaronitrile, 9% 2-methyl-2-butenenitrile, 4% 2-methyl-3-butenenitrile, 14% 3-pentenenitrile, and 1% 4-pentenenitrile.

Example VI

A mixture of 5.0 g. of Ni[P(OC$_2$H$_5$)$_3$]$_4$, 20 g. of 3-pentenenitrile, and 0.2 g. of sodium borohydride is charged to a 100 ml. glass flask. The system is purged with nitrogen and heated to 120° C. Hydrogen cyanide gas is swept across the surface of the hot reaction mixture using a nitrogen sweep gas. A total of 9 ml. of liquid hydrogen cyanide is added over a period of one hour. A light yellow solid is present during all of the reaction period. Gas chromatographic analysis of the crude liquid shows that it contains 23% adiponitrile, 3.6% 2-methylglutaronitrile and 0.9% ethylsuccinonitrile.

Example VII

A mixture of 20 g. of 3-pentenenitrile, 0.6 g. of nickel cyanide, 6.2 g. of triphenylphosphite, and 0.2 g. of sodium borohydride is charged to a 100 ml. glass flask and purged with nitrogen. The mixture is heated to 120° C. and hydrogen cyanide gas is swept across the surface of the hot mixture. A total of 4 ml. of liquid hydrogen cyanide is added over a period of 30 minutes. Gas chromatographic analysis of the crude liquid shows that it contains 1.6% adiponitrile and 1.3% 2-methylglutaronitrile.

Example VIII

A mixture of 13.5 g. of Ni[P(OC$_6$H$_5$)$_3$]$_4$, 60 g. of 3-pentenenitrile, and 0.2 g. of sodium borohydride is charged to a 200 ml. glass flask and the system is purged with nitrogen. The mixture is heated to 120° C. and hydrogen cyanide gas is swept across the hot reaction mixture. Temperature of the mixture rises to 123° C.; the bath is 122° C. A total of 10 ml. of liquid hydrogen cyanide is added to the system over a one-hour period. At this time, the temperature of the reaction mixture and bath are equal. Analysis shows that the crude liquid contains 23% adiponitrile, 5% 2-methylglutaronitrile and 2% ethylsuccinonitrile. Approximately 0.1 g. of additional sodium borohydride is added to the reaction mixture and hydrogen cyanide flow is resumed. Temperature of the mixture rises 3° above that of the bath. Hydrogen cyanide gas is swept across the mixture until the temperature of the reaction mixture and bath are both 120° C. Analysis of the crude liquid shows that it contains 25% adiponitrile, 6.7% 2-methylglutaronitrile and 2% ethylsuccinonitrile.

A further addition of 0.2 g. of sodium borohydride followed by hydrogen cyanide addition results in a temperature jump of 7° in the reaction mixture. A total of 25 ml. of liquid hydrogen cyanide is swept over the surface of the mixture over 45 minutes. Temperature of the mixture and bath are both 121° C. Analysis shows that the liquid contains 31% adiponitrile, 8.5% 2-methylglutaronitrile, and 3% ethylsuccinonitrile.

Example IX

A mixture of 4.5 g. of Ni[P(OC$_6$H$_5$)$_3$]$_4$ and 20 g. of 3-pentenenitrile is charged to a 100 ml. glass flask and the system is purged with nitrogen. The mixture is heated to 120° C. and hydrogen cyanide gas is swept across the hot reaction mixture by a nitrogen carrier gas. A total of 9 ml. of liquid hydrogen cyanide is added over a 1.5 hour period. A light green solid gradually forms. Gas chromatographic analysis of the crude liquid shows that it contains 2.9% adiponitrile. Approximately 0.1 g. of sodium borohydride is added to the spent catalyst system and the mixture is again heated to 120° C. Hydrogen cyanide gas is swept across the hot reaction mixture by a nitrogen carrier gas. Temperature of the reaction mixture rises 5° higher than that of the oil bath (121° C.) during the initial hydrogen cyanide addition. When the temperature of the mixture drops to 121° C., a sample of the liquid is removed and analyzed by gas chromatography. Analysis shows that the crude sample contains 24% adiponitrile. A second additon of sodium borohydride followed by hydrogen cyanide addition raises the adiponitrile concentration to 27% in the crude liquid reaction mixture.

Example X

A mixture of

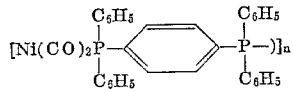

20 g. of 3-pentenenitrile, and 0.2 g. of sodium borohydride is charged to a 100 ml. glass flask and the system is purged well with nitrogen. The mixture is heated to 120° C. and hydrogen cyanide gas is swept across the hot reaction mixture by a nitrogen carrier gas. After an induction period of about 9 minutes, the temperature of the reaction mixture rises to 128° C. which is 8° above the temperature of the surrounding bath. A total of 6.3 g. of liquid hydrogen cyanide is added over a 45 minute period. Gas chromatographic analysis shows that the crude liquid product contains 20% adiponitrile, 5% 2-methylglutaronitrile and 2.3% ethylsuccinonitrile.

Example XI

A mixture of 20 g. of 3-pentenenitrile, 2.5 g. of triphenylantimony and 0.9 ml. of liquid nickel tetracarbonyl is added to a 100 ml. glass flask. When evolution of gas (carbon monoxide) has stopped, 0.2 g. of sodium borohydride is added and the mixture is heated to 120° C. A stream of hydrogen cyanide gas is then swept across the surface of the reaction mixture. A total of 6.3 g. of liquid hydrogen cyanide is added over a period of 30 minutes. Gas chromatographic analysis shows that the crude liquid sample contains 1.8% adiponitrile, 2.6% 2-methylglutaronitrile and 1.6% ethylsuccinonitrile.

Example XII

A mixture of 20 g. of 3-pentenenitrile, 10 g. of triphenylphosphine, 3.15 g. of bis(acrylonitrile) nickel (O) and 0.2 g. of sodium borohydride is charged to a 100 ml. glass flask which has been purged well with nitrogen. The mixture is heated to 120° C. and hydrogen cyanide gas is swept across the surface of the reaction mixture in a nitrogen carrier gas. Temperature of the reaction jumps to 129° C. and then slowly decreases. A total of 6.3 g. of liquid hydrogen cyanide is added over a period of 45 minutes. Gas chromatographic analysis shows that the crude liquid sample contains 4.1% adiponitrile and trace amounts of 2-methylglutaronitrile and ethylsuccinonitrile.

Example XIII

Ni[P(OC$_2$H$_5$)$_3$]$_4$ is dissolved in 3-pentenenitrile (containing 95% trans-3-pentenenitrile and 5% cis-3-pentenenitrile) at room temperature to form a solution 0.226 M in the nickel complex and 8.78 M in 3-pentenenitrile, 18.7% and 81.3% respectively by weight. The nickel complex and its solution is protected from the atmosphere by a nitrogen blanket at all times. A 100 ml. capacity O-ring syringe is filled with this solution and placed in a variable speed syringe pump, for subsequent delivery to the reactor.

Anhydrous liquid hydrogen cyanide (stabilized with H$_2$SO$_4$ and SO$_2$) is charged into a 50 ml. capacity plastic, disposable syringe and placed inside a metal cylinder open at both ends which completely surrounds the barrel of the syringe. The cylinder is wrapped with coils of copper tubing through which ice water is circulated so as to maintain the hydrogen cyanide at 0 to 5° C. This assembly, containing the hydrogen cyanide syringe is placed in a variable speed syringe pump, for subsequent delivery to the reactor.

Numerous small glass tubes are packed with approximately 0.1 g. each of powdered sodium borohydride. These tubes are fitted with a plunger at one end and stored in a dry atmosphere for subsequent use in addition of the tube contents to the reactor at intervals during the reaction period.

The reactor is a cylindrical glass vessel having a height twice the diameter and having a volume of 50 cc. An overflow is provided at the top. The head of the reactor is provided with an efficient stirrer and four small ports which are closed with rubber septa. The reactor is jacketed to provide for circulation of a heat transfer fluid which is controlled at 125° C. The reactants are pumped into the reactor from the syringes through small stainless steel tubes which enter the reactor through the rubber septa. Under actual operating conditions in which vigorous agitation is maintained, the steady state liquid volume of the reactor is 35 cc. Off gas and liquid product are emitted through the overflow port. The liquid product is collected in a receiver and periodically removed. The off gas is passed to vent through a condenser maintained at 0 to 5° C. Before beginning the reaction, the reactor is swept with pure nitrogen to remove atmospheric oxygen and water vapor. During the reaction, a minute nitrogen sparge is maintained to reduce the possibility of the entry of oxygen. Temperature in the reactor is measured by a thermocouple and continuously recorded by an automatic strip chart recorder.

After an efficient nitrogen sweep and while still at room temperature 0.2 g. of NaBH$_4$ is added to the reactor.

Thirty-five cc. of the catalyst solution in 3-pentenenitrile is pumped into the reactor and agitation begun. Circulation of heat transfer medium in the jacket is started. When the reactor temperature reaches 105° C. the hydrogen cyanide feed pump is started and set to deliver 1.32 millimoles of hydrogen cyanide per minute. The instant the hydrogen cyanide begins is noted as time zero. At time 8 minutes, it is apparent from the evolution of heat and

TABLE I

| Time, minutes | Temperature, 0° C. | Feed Ratios | | Adiponitrile, wt. percent | Remarks |
|---|---|---|---|---|---|
| | | HCN/3-PN | 3-PN/Cat. | | |
| 0-15 | | | | | Start-up period. |
| 20 | 121.0 | 0.15 | 38.7 | 0.6 | |
| 41 | 121.5 | 0.15 | 38.7 | 2.0 | |
| 71 | 122.9 | 0.15 | 38.7 | 6.4 | Approaching steady state. |
| 91 | 121.0 | 0.15 | 38.7 | 7.2 | |
| 111 | 121.5 | 0.15 | 38.7 | 7.0 | |
| 133 | 121.5 | 0.15 | 38.7 | 7.8 | |
| 151 | 121.5 | 0.15 | 38.7 | 8.6 | |
| 173 | 121.5 | 0.15 | 38.7 | 8.6 | Steady state operation. |
| 193 | 121.5 | 0.15 | 38.7 | 8.3 | |
| 216 | 121.5 | 0.15 | 38.7 | 8.7 | |
| 238 | 122 | | | 10.6 | |
| 251 | 122 | 0.25 | 38.7 | 12.8 | |
| 270 | 121.5 | 0.25 | 38.7 | 12.2 | |
| 280 | 121.5 | 0.25 | 38.7 | 12.7 | Operation at higher pentenenitriles conversion level. |
| 308 | 121.5 | 0.25 | 38.7 | 11.1 | |
| 328 | 121.5 | 0.25 | 38.7 | 10.9 | |
| 349 | 121.5 | 9.25 | 38.7 | 11.4 | |
| 368 | 121.5 | 0.25 | 38.7 | 12.6 | |
| 377 | 121.5 | | | 13.9 | |

TABLE II
Material Balance and Conversion and Yield Calculations

| In | Out |
|---|---|
| 311.8 g. catalyst and 3-pentenenitrile. | 302.85 g. total product |
| 16.5 g. HCN. | 12.6 samples during run. |
| 1.8 g. NaBH₄. | |
| 330.1 g. | 315.4 g. |

∴ 95.5% overall material balance.

The final product contains 3.5 g. of solids—essentially all Na₂Ni(CN)₄. The liquid product is analyzed by gas chromatography as follows:

Recycleable PN:
  Trans-3-pentenenitrile _____ 51.38%
  Cis-3-pentenenitrile _____ 10.36%
  4-pentenenitrile _____ 5.33%
                                                    ——— 67.07%
Yield loss:
  Cis-2-pentenenitrile _____ 0.70%
  Trans-2-pentenenitrile _____ 0.88%
  Valeronitrile _____ 1.48%
  Unknown (cis-2-methyl-2-butenenitrile) _____ .08%
  Ethylsuccinonitrile _____ .32%
  2-methyl glutaronitrile _____ 1.19%
                                                    ——— 4.65%
Product: Adiponitrile _____ 8.11%   8.11%
Other: Nickel (titrimetric analysis) _____ 1.19%   1.19%
                                                            ———
                                                            81.02%

The balance unaccounted for is assumed to be ethyl phosphite (or products from the decomposition of the phosphite) and complexed CN⁻.

TABLE III
Yield Calculation Based on Following Pentenenitrile Balance

| | Charge 311.8 g. total | − | Out, Liquid Product (315.4−3.5=312 g.) | + | Out, Benzene Washings (96.8 g. total) | = Difference |
|---|---|---|---|---|---|---|
| 3-pentenenitrile | (311.8 g.) (.813)=253 g. (3.15 mole). | | (312 g.) (.6174)=193 g. (2.38 mole). | | (96.8 g.) (.0241)=2.33 g. (0.03 mole). | +0.74 |
| 4-pentenenitrile | 0 | | (312 g.) (.0533)=16.6 g. (0.205 mole). | | | −0.205 |
| Valeronitrile | 0 | | (312 g.) (.0148)=5.62 g. (0.056 mole). | | | −0.056 |
| Cis-2-PN Trans-2-PN Unknown | 0 | | (312 g.) (.0166)=5.18 g. (0.064 mole). | | | −0.064 |
| Ethyl succinonitrile and 2-methylglutaronitrile | 0 | | (312 g.) (.0251)=7.83 g. (0.072 mole). | | | −0.072 |
| Adiponitrile | 0 | | (312 g.) (.0811)=25.3 g. (0.234 mole). | | (96.8 g.) (0.004)=0.387 g. (0.003 mole). | −0.237 |
| Moles of starting pentenenitrile unaccounted for | | | | | | +.106 |

Pentenenitrile balance = $\frac{(3.15-0.106)(100)}{3.15}$ = 96.6%

Pentenenitrile conversion = $\frac{.535(100)}{3.15}$ = 17.0%

Yield to adiponitrile = $\frac{0.237(100)}{.535}$ = 44.3% from visual appearances that the reaction has begun and is proceeding normally. Then the catalyst and 3-pentenenitrile solution is pumped into the reactor at a feed rate of 1 cc./min. The feed ratios are (in moles): HCN/3-pentenenitrile=0.15, 3-pentenenitrile/

$$Ni[P(OC_6H_5)_3]_4 = 38.7$$

The first liquid product spills out the overflow at time 15 minutes. The reactor is now operating continuously. The NaBH₄ is added every 20 minutes in 0.1 g. increments starting at time 30 minutes. Since the liquid hold-up is 35 cc. and the feed rate is 1 cc./min., the "space time" or "residence time" is 35 minutes. After 4 time (or after 155 minutes) the concentrations of products in the reactor has become constant and the reactor is considered to have reached steady state conditions. Steady state conditions are maintained through 6 time (or 225 min.) before feed ratios are changed in order to illustrate performance at other conditions. Table I reports data on reaction conditions and product analyses during an entire run. After the reaction is completed, the reactor is drained and washed with benzene. These benzene washings are maintained separately and their contents are reported in Table III.

Example XIV

Sodium borohydride (0.20 g.) is placed in a flask equipped with a magnetic stirrer, a gas inlet tube and an outlet tube through a water cooled condenser and an injection port sealed with a serum stopper. The flask is swept with nitrogen and a nitrogen flow of ca. 5 ml./min. is maintained throughout the reaction. A slurry of tetrakis [triphenylphosphite] nickel (O) catalyst (5.0 g. 0.00385 mole) in p-xylene (50 ml.) is injected into the flask via the injection port, and the flask is warmed to 120° C. and maintained at that temperature throughout the reaction. A gaseous mixture of allene (flow rate ca. 0.0026 mole/min.) and hydrogen cyanide (flow rate ca. 0.0019 mole/min.) is passed over the well-stirred solution for a period of 200 minutes while 0.390 mole of hydrogen cyanide is introduced into the flask. The reaction mixture is then cooled and evaporatively distilled at room temperature and 0.02 mm. to afford 12.9 g. of residue and 56.1 g. of condensate composed of butenenitriles and p-xylene. A portion of the condensate is subjected to gas chromatography (tricresyl phosphate column, 70° C.) and the individual components are collected from the effluent stream and identified by infrared and nuclear magnetic resonance spectroscopy. For a quantitative assay of the reaction mixture, a portion of the condensate, to which has been added 1,2-dichloroethane as an internal standard, is subjected to gas chromatography, and the four butenenitriles and the internal standard are isolated from the effluent stream in a single trap, the contents of which is analyzed by nuclear magnetic resonance spectroscopy. In this manner, it is established that the yield of butenenitriles is 14.02 g. (0.209 mole, 54% on hydrogen cyanide) and that the composition of the butenenitriles is: 81.5% allyl cyanide, 8.8% methacrylonitrile, 6.6% cis-crotononitrile and 4.8% trans-crotononitrile.

Example XV

Sodium borohydride (0.10 g.) is placed in a flask eqiupped with a magnetic stirrer and surmounted by a water cooled reflux condenser fitted with gas inlet and outlet tubes and an injection port sealed with a serum stopper. The flask is swept with nitrogen and a nitrogen flow of ca. 10 ml./min. is maintained throughout the reaction. A slurry of tetrakis [triphenylphosphite] nickel (O) catalyst (2.0 g., 0.00154 mole) in allyl cyanide (22.1 g., 0.330 mole) is injected into the flask via the injection port and the flask is warmed to 120° C. and maintained at that temperature throughout the reaction. Gaseous hydrogen cyanide (flow rate ca. 0.0027 mole/min.) is passed over the well-stirred solution for a period of 145 minutes while 0.390 mole of hydrogen cyanide is introduced into the flask. The reaction mixture is then cooled and evaporatively distilled at 100° C. and 0.01 mm. to afford 2.5 g. of residue and 21.3 g. of condensate. Gas chromatography of a portion of the condensate reveals the presence of two major product components which are isolated from the effluent stream and are identified as glutaronitrile and methylsuccinonitrile by infrared and nuclear magnetic resonance spectroscopy. Quantitative analysis is by gas chromatography, the integrated areas under the product peaks being compared with that under the glutaronitrile peak in a standard solution of glutaronitrile in allyl cyanide. In this manner, it is determined that glutaronitrile and methylsuccinonitrile are produced in yields of 9.2% and 2.6% respectively, based on allyl cyanide.

Example XVI

Reaction is conducted as in Example XV with allyl cyanide (23.5 g., 0.350 mole), hydrogen cyanide (0.390 mole, flow rate ca. 0.0031 mole/min.), tetrakis [triphenyl phosphite] nickel (O) catalyst (2.0 g., 0.00154 mole) and sodium borohydride (0.10 g.), but at a temperature of 80° C. The reaction mixture is processed and analyzed as in Example XV. Glutaronitrile and methylsuccinonitrile are formed in yields of 0.9% and 0.5% respectively, based on allyl cyanide.

Example XVII

Reaction is conducted as in Example XV with allyl cyanide (22.4 g., 0.334 mole), hydrogen cyanide (0.390 mole, flow rate ca. 0.0027 mole/min.) and sodium borohydride (0.10 g.) but with tetrakis [triethyl phosphite] nickel (O) (2.0 g., 0.00276 mole) as the catalyst and at a temperature of 100° C. The reaction mixture is processed and analyzed as in Example XV. Glutaronitrile and methylsuccinonitrile are formed in yields of 17.5% and 6.8%, respectively, based on allyl cyanide.

Example XVIII

Reaction is run exactly as in Example XVII, but in the presence of additional sodium borohydride (0.50 g. total). Glutaronitrile and methylsuccinonitrile are formed in yields of 2.3% and 8.0% respectively, based on allyl cyanide.

Example XIX

Reaction is run exactly as in Example XVII, but with p-xylene (50 ml.) added. Glutaronitrile and methylsuccinonitrile are formed in yields of 1.4% and 0.7% respectively, based on allyl cyanide.

Example XX

To a mixture of 6 g. of insoluble polymeric nickel complex, prepared as described below, 0.2 g. of sodium borohydride and 26.6 g. of 3-pentenenitrile contained in a 200 ml. reactor equipped with a mechanical stirrer, reflux condenser, a gas inlet tube and a heating jacket is introduced 6.8 g. of liquid hydrogen cyanide as a gas over a period of one hour along with some nitrogen. Gas chromatographic analysis of the product indicates that 3.6% of the 3-pentenenitrile is converted to dinitriles of which 67% is adiponitrile, 22% 2-methylglutaronitrile and 11% ethylsuccinonitrile.

The polymeric nickel complex is prepared in three steps. An insoluble terpolymer is obtained by polymerizing a mixture of 10.4 g. of styrene, 23 g. of p-iodostyrene, 1.0 g. of divinylbenzene and 0.3 g. of benzoyl peroxide as a dispersion in 200 ml. of water and 0.5 g. of polyvinyl alcohol (Elvanol 52–22) at 60° C. for 2 hours and 85° C. for 12 hours. The polymer (30.5 g.) consisting of small spheres is isolated by filtration through a 100 mesh screen. It is washed with methanol before drying. This polymer suspended in 250 ml. of benzene is treated with lithium butyl (60 ml. of 15% in hexane) for 16 hours at 25° C. and then diphenyl phosphinous chloride (21.2 g.) is added and the stirring continues for 15 hours. The polymeric phosphine is isolated by adding 800 ml. of methanol and filtering. The polymer weighs 33.8 g. and contains 3.5% P. To a portion (30 g.) of this polymer suspended in 200 ml. of tetrahydrofuran is added at 25° C. with stirring 12.5 g. of nickel tetracarbonyl in 25 ml. of tetrahydrofuran. After 30 minutes, the mixture is refluxed 1 hour. Carbon monoxide (1.23 l.) is evolved. The nickel-containing polymer (31.5 g.) is isolated by filtration and dries under a stream of nitrogen. It contains 6.5% Ni and 2.9% P.

Example XXI

Tetrakis (trifluorophosphine) nickel (O), $Ni(PF_3)_4$, is prepared according to T. Kruck and K. Baur, Chem. Ber., 98, 3070 (1965) by the direct reaction of $PF_3$ and Ni with the exception that the metallic nickel is not obtained by the thermal decomposition of nickelous oxalate, but rather by the reduction of $NiCl_2 \cdot 6H_2O$ with $NaBH_4$. Eight grams (0.136 mole) Ni-powder (pyrophoric), is sealed in an ampule and pressurized in an 80 cc. autoclave with 300 atm., $PF_3$, heated to 100° C. and rocked at that temperature for 45 hours. Excess $PF_3$ is stripped off at −100° C. and the residue distilled. Boiling point 60° C./600 mm. Hg, 34 g., 61%.

(a) One gram, 0.0025 mole of this, $Ni(PF_3)_4$ and 10 g., 0.123 mole 3-pentenenitrile, are heated to 60° C. On heating $PF_3$ evolves and the two-phase system becomes a single phase. Hydrogen cyanide is carried with a nitrogen stream (40 ml./min.) over the surface of the reactants. No dinitriles can be found in the resulting product.

(b) To the same reaction as in (a) above, is added 0.1 g. $NaBH_4$. After one hour 0.21% ethylsuccinonitrile, 0.16% 2-methylglutaronitrile and a trace of adiponitrile are obtained.

Example XXII

A mixture of 20 g. of 3-pentenenitrile, 4.5 g. of $Ni[P(OC_6H_5)_3]_4$, 2.2 g. of $P(OC_6H_5)_3$, and 0.2 g. of sodium borohydride is charged to a 100 ml. glass reaction flask. The system is purged with nitrogen, and the mixture is heated to 120° C. Hydrogen cyanide gas is swept across the surface of the hot mixture in a nitrogen carrier gas. A total of 9 ml. of liquid hydrogen cyanide is added over a period of 45 minutes. Gas chromatographic analysis shows that the crude product contains 29.6% adiponitrile, 5.8% 2-methylglutaronitrile, and 1.6% ethylsuccinonitrile.

Further improvements in the conversion of 3-pentenenitrile to dinitriles are observed with larger amounts of free phosphite. Table IV illustrates the effect.

TABLE IV

| Moles Excess Phosphite/Mole Ni | Percent Dinitrile in Product | | |
|---|---|---|---|
| | Adiponitrile | 2-methylglutaronitrile | Ethylsuccinonitrile |
| 2 | 29.6 | 5.8 | 1.6 |
| 4 | 33.4 | 6.5 | 1.8 |
| 6 | 37.1 | 6.9 | 2.0 |
| 10 | 43.3 | 7.8 | 2.4 |

Example XXIII

A mixture of 20 g. of 3-pentenenitrile, 4.5 g. of Ni[P(OC$_6$H$_5$)$_3$]$_4$, and 0.05 g. of lithium borohydride is charged to a 100 ml. glass flask. The system is purged with nitrogen and the mixture is heated to 120° C. Hydrogen cyanide gas is swept across the surface of the hot mixture in a nitrogen carrier gas. A total of 9 ml. of liquid hydrogen cyanide is added over a period of 50 minutes. Gas chromatographic analysis shows that the crude reaction mixture contains 5.4% adiponitrile, 1.1% 2-methylglutaronitrile and 0.3% ethylsuccinonitrile.

Example XXIV

A mixture of 20 g. of 3-pentenenitrile, 4.5 g. of Ni[P(OC$_6$H$_5$)$_3$]$_4$, and 0.2 g. of tetramethylammonium borohydride is charged to a 100 ml. glass reaction flask. The system is purged with nitrogen and the reaction mixture is heated to 120° C. Hydrogen cyanide gas is swept across the surface of the hot mixture in a nitrogen carrier gas. A total of 9 ml. of liquid hydrogen cyanide is added over a period of one hour. Gas chromatographic analysis shows that the crude reaction mixture contains 10% adiponitrile, 2.3% 2-methylglutaronitrile and 0.8% ethylsuccinonitrile.

Example XXV

A mixture of 20 g. of 4-pentenenitrile, 4.5 g. of Ni[P(OC$_6$H$_5$)$_3$]$_4$, and 0.2 g. of sodium borohydride is charged to a 100 ml. glass flask. The system is purged with nitrogen and the reaction mixture is heated to 120° C. Hydrogen cyanide gas is swept across the hot mixture in a nitrogen carrier gas. A total of 9 ml. of liquid hydrogen cyanide is added over a period of one hour. Gas chromatographic analysis of the crude reaction mixture shows that the sample contains 24% adiponitrile, 5.9% 2-methylglutaronitrile, and 1.2% ethylsuccinonitrile.

Example XXVI

A mixture of 20 g. of 3-pentenenitrile, 4.5 g. of Ni[P(OC$_6$H$_5$)$_3$]$_4$, and 0.2 g. of potassium borohydride is charged to a 100 ml. glass flask. The system is purged with nitrogen and the reaction mixture is heated to 120° C. Hydrogen cyanide gas is swept across the surface of the hot mixture in a nitrogen carrier gas. A total of 9 ml. of liquid hydrogen cyanide is added over a period of 50 minutes. Gas chromatographic analysis shows that the crude reaction mixture contains 21% adiponitrile, 5.7% 2-methylglutaronitrile, and 1.7% ethylsuccinonitrile.

Example XXVII

A mixture of 20 g. of 3-pentenenitrile and 3.8 g. of phenyl diphenylphosphinite is charged to a 100 ml. glass flask. The system is purged with nitrogen and 1 ml. of liquid nickel tetracarbonyl is added. Vigorous evolution of gas occurs. When evolution of gas stops, 0.2 g. of sodium borohydride is added, and the mixture is heated to 120° C. Hydrogen cyanide gas is swept across the surface of the hot mixture in a nitrogen carrier gas. A total of 9 ml. of liquid hydrogen cyanide is added over a period of 50 minutes. Gas chromatographic analysis shows that the crude reaction mixture contains 33% adiponitrile, 6.4% 2-methylglutaronitrile and 1.7% ethylsuccinonitrile.

Example XXVIII

A mixture of 20 g. of 3-pentenenitrile and 1.4 g. of tributylphosphine is charged to a 100 ml. glass flask. The system is purged with nitrogen and 1 ml. of liquid nickel tetracarbonyl is added dropwise. The solution is then warmed to 50° C. and maintained at this temperature until gas evolution stops. To the clear solution is added 0.2 g. of sodium borohydride and the mixture is warmed to 120° C. Hydrogen cyanide gas is swept across the surface of the hot reaction mixture in a nitrogen carrier gas. Temperature of the mixture rises to 122° C., then slowly decreases. A total of 9 ml. of liquid hydrogen cyanide is added over a period of 40 minutes. Gas chromatographic analysis shows that the crude product contains 0.8% adiponitrile, 0.7% 2-methylglutaronitrile and 0.2% ethylsuccinonitrile.

Example XXIX

A mixture of 20 g. of 3-pentenenitrile, 2 g. of bis-acetylacetonato-nickel (II), and 3.6 g. of triphenylphosphine is charged to a 100 ml. glass flask which has been purged with nitrogen. The mixture is heated to 120° C. and 0.4 g. of sodium borohydride is added. A yellow green reaction mixture results. Hydrogen cyanide gas is swept across the surface of the reaction mixture in a nitrogen carrier gas. Temperature of the reaction mixture rises to 128° C., then slowly decreases. A total of 9 ml. of liquid hydrogen cyanide is added over a period of 45 minutes. Gas chromatographic analysis shows that the crude liquid product contains 1% adiponitrile, 0.2% 2-methylglutaronitrile and 0.08% ethylsuccinonitrile.

Example XXX

A mixture of 20 g. of 3-pentenenitrile and 2 g. of ortho-phenylenebisdimethylarsine is charged to a 3-neck, 100 ml. glass flask fitted with a gas inlet tube above the liquid level, a gas exit through a reflux condenser, and a thermometer. The system is purged with nitrogen and 1.0 ml. of liquid nickel tetracarbonyl is added dropwise. The solution is warmed to 50° C. and maintained at this temperature until evolution of carbon monoxide gas stops. At this time, 0.2 g. of sodium borohydride is added and the mixture is heated to 120° C. A stream of hydrogen cyanide gas is then swept across the surface of the reaction mixture using a nitrogen sweep gas. A total of 9 ml. of liquid hydrogen cyanide is added over a period of one hour. Gas chromatographic analysis shows that the crude liquid contains 5.2% adiponitrile, 4.6% 2-methylglutaronitrile and 1.7% ethylsuccinonitrile.

Example XXXI

A mixture of 20 g. of 3-pentenenitrile and 3.0 g. of (C$_6$H$_5$)$_2$PCl is charged to a 100 ml. glass flask. The system is is purged well with nitrogen and 1 ml. of liquid nickel tetracarbonyl is added dropwise. Vigorous evolution of gas occurs. When gas evolution stops 0.2 g. of sodium borohydride is added and the mixture is heated to 120° C. Hydrogen cyanide gas is swept across the surface of the reaction mixture in a nitrogen carrier gas. A total of 9 ml. of liquid hydrogen cyanide is added over a period of 20 minutes. Gas chromatographic analysis shows that the crude product contains 0.4% adiponitrile, 0.3% 2-methylglutaronitrile, and 0.3% ethylsuccinonitrile.

Example XXXII

A mixture of 2.72 g. of

10.15 g. of 3-pentenenitrile, and 0.05 g. of sodium borohydride is charged to a three-neck, 50 ml. glass flask fitted with a gas inlet tube above the liquid level, a gas exit through a reflux condenser and a thermometer. The system is purged with nitrogen and a stream of hydrogen cyanide gas at a rate of about 2 ml./hr. (measured as a liquid) is swept across the surface of the reaction mixture along with nitrogen at a rate of 22 cc./min. The initial temperature of the in-gas is 21° C. and the out-gas 94° C.; but this rises in 11 minutes to an in-gas temperature of 117° C. and an out-gas temperature of 122° C., and temperatures are maintained close to these levels for the remainder of the run. After an additional 82 minutes, the run is stopped. Analysis of the crude liquid indicates that 20.49% adiponitrile, 3.62% 2-methylglutaronitrile and 0.81% ethylsuccinonitrile are present.

Example XXXIII

A mixture of 2.81 g. of

10.15 g. of 3-pentenenitrile and 0.05 g. of sodium borohydride is charged to a three-neck, 50 ml. glass flask fitted with a gas inlet tube above the liquid level, a gas exit through a reflux condenser and a thermometer. The system is purged with nitrogen and a stream of hydrogen cyanide gas at a rate of about 2 ml./hr. (measured as a liquid) is swept across the surface of the reaction mixture along with nitrogen at a rate of about 35 cc./min. The initial temperature of the bath is 138° C. which gradually rises to 155° C. during the run, which lasts 275 minutes. After this time, the apparatus is shut down and the crude liquid is found to contain 10.5% adiponitrile, 2.5% 2-methylglutarnonitrile and 0.90% ethylsuccinotrile.

Example XXXIV

A 50 ml. three-neck, round bottom flask, fitted with a water cooled reflux condenser connected to a Dry Ice trap, an inlet and a magnetic stirrer is set up in an oil bath maintained at 80° C., and purged with nitrogen. The flask is charged with 0.65 g. (0.0005 mole) of $$Ni[POC_6H_5)_3]_4$$

0.242 g. (0.001 mole) of B(C₆H₅)₃, 20 g. (0.248 mole) of 3-pentenenitrile and 3.0 g. (0.01 mole) of P(OC₆H₅)₃. A stream of nitrogen gas at a rate of 15 ml./minute is bubbled through liquid hydrogen cyanide contained in a 20 ml. flask cooled in an ice bath. The resulting gas mixture is then swept across the surface of the reaction mixture in the flask. After 5 hours and 35 minutes, the reaction is shut down.

Gas chromatographic analysis indicates that of the dicyanobutanes produced 94% is adiponitrile. The number of cycles (mole ratio of dicyanobutanes produced to nickel catalyst charged) is 87.

Example XXXV

A 50 ml., three-neck, round bottom flask fitted with a water cooled reflux condenser connected to a Dry Ice trap, an inlet and a magnetic stirrer, is set up in an oil bath maintained at 80° C. and purger with nitrogen. The flask is charged with 0.325 g. (0.00025 mloe) of $$Ni[P(OC_6H_5)_3]_4$$

0.026 g. (0.0005 mole) of

3.1 g. (0.01 mole) of P(OC₆H₅)₃ and 20 g. (0.25 mole) of 3-pentenenitrile. A stream of nitrogen gas is bubbled through 11.9 ml. of liquid hydrogen cyanide contained in a 20 ml. flask cooled in an ice bath. The resulting gas mixture is swept across the surface of the reaction mixture in the flask. After 6 hours and 45 minutes the reaction is shut down. The total hydrogen cyanide fed to the flask is 1.5 ml. (as measured in liquid form at 0° C.).

Gas chromatographic analysis indicates that of the dicyanobutanes produced 78.5% is adiponitrile. The number of cycles (mole ratio of dicyanobutanes produced to nickel catalyst charged) is 103.

Example XXXVI

A 50 ml. three-neck, round bottom flask, fitted with a water cooled reflux condenser connected to a Dry Ice trap, an inlet and a magnetic stirrer, is set up in oil bath maintained at 60° C., and purged with nitrogen. The flask is charged with 0.324 g. (0.00025 mole) of $$Ni[P(OC_6H_5)_3]_4$$

0.206 g. (0.0005 mole) of

3.1 g. (0.01 mole) of P(OC₆H₅)₃ and 20 g. (0.25 mole) of 3-pentenenitrile. A stream of nitrogen gas is bubbled through 11.0 ml. liquid hydrogen cyanide contained in a 20 ml. flask cooled in an ice bath. The resulting gas mixture is swept across the surface of the reaction mixture in the flask. After 6 hours and 35 minutes the reaction is shut down. The total hydrogen cyanide fed to the flask is 1.8 ml. (as measured in liquid form at 0° C.).

Gas chromatographic analysis indicates that of the dicyanobutanes produced 75.2% is adiponitrile. The number of cycles (mole ratio of dicyanobutanes produced to nickel catalyst charged) is 83.

Example XXXVII

A 50 ml., three-neck, round bottom flask, fitted with a water cooled reflux condenser connected to a Dry Ice trap, an inlet, a thermometer and a magnetic stirrer, is set up in an oil bath maintained at 80° C., and purged with nitrogen. The flask is charged with 0.650 g. (0.0005 mole) of Ni[P(OC₆H₅)₃]₄, 0.82 g. (0.002 mole) of

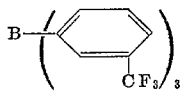

3.1 g. (0.01 mole) of P(OC₆H₅)₃ and 20.0 g. (0.25 mole) of 3-pentenenitrile. A stream of nitrogen gas is bubbled through liquid hydrogen cyanide contained in a 20 ml. flask cooled in an ice bath. The resulting gas mixture is swept across the surface of the rection mixture in the flask. After 5 hours the reaction is shut down.

Gas chromatographic analysis indicates that of the dicyanobutanes produced 78% is adiponitrile. The number of cycles (mole ratio of dicyanobutanes produced to catalyst charged) is 128.

Example XXXVIII

A 50 ml. three-neck, round bottom flask, fitted with a water cooled reflux condenser connected to a Dry Ice trap, an inlet, a thermometer and a magnetic stirrer, is set up in an oil bath maintained at 80° C., and purged with nitrogen. The flask is charged with 0.650 g. (0.0005 mole) of Ni[P(OC₆H₅)₃]₄, 0.512 g. ( 0.001 mole) of

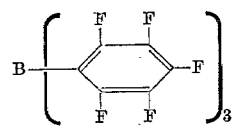

3.1 g. (0.01 mole) of P(OC₆H₅)₃ and 20 g. (0.25 mole) of 3-pentenenitrile. A stream of nitrogen gas is bubbled through 11.6 ml. of liquid hydrogen cyanide in a 20 ml. flask contained in an ice bath. The resulting gas mixture is swept across the surface of the reaction mixture in the flask. After 23 hours and 30 minutes the reaction is shut down. At shut-down all of the hydrogen cyanide in the flask has been fed to the reaction mixture in the flask.

Gas chromatographic analysis indicates that of the dicyanobutanes produced 74% is adiponitrile. The number of cycles (mole ratio of dicyanobutanes produced to catalyst charged) is 132.

Example XXXIX

A 50 ml., three-neck, round bottom flask, fitted with a water cooled reflux condenser connected to a Dry Ice trap, an inlet, a thermometer and a magnetic stirrer, is set up in an oil bath maintained at 115° C., and purged with nitrogen. The flask is charged with 1.3 g. (0.001 mole) of Ni[P(OC$_6$H$_5$)$_3$]$_4$, 0.98 g. (0.01 mole) of B(C$_2$H$_5$)$_3$, 3.10 g. (0.01 mole) of P(OC$_6$H$_5$)$_3$ and 16.2 g. (0.2 mole) of 3-pentenenitrile. A stream of nitrogen gas is bubbled through 16.3 ml. of liquid hydrogen cyanide contained in a 20 ml. flask cooled in an ice bath. The resulting gas mixture is swept across the surface of the reaction mixture in the flask. The nitrogen gas flow is adjusted to 20 ml. of nitrogen gas per minute. After 4 hours the reaction is shut down.

Gas chromatographic analysis indicates that the 3-pentenenitrile converted to dicyanobutanes 86% is adiponitrile, 13.2% is 2-methylglutaronitrile and 1.04% is ethylsuccinonitrile. The number of cycles (mole ratio of dicyanobutanes produced to catalyst charged) is 38.

Example XL

A 50 ml., three-neck, round bottom flask, fitted with a water cooled reflux condenser connected to a Dry Ice trap, an inlet, a thermometer and a magnetic stirrer, is set up in an oil bath maintained at 120° C. The flask is charged with 16.2 g. (0.2 mole) of 3-pentenenitrile, 1.3 g. (0.001 mole) of Ni[P(OC$_6$H$_5$)$_3$]$_4$, 1.7 g. (0.01 mole) of B(C$_4$H$_9$)$_3$ and 3.1 g. (0.01 mole) of P(OC$_6$H$_5$)$_3$. A stream of nitrogen gas is bubbled through hydrogen cyanide contained in a 20 ml. flask cooled in an ice bath. The resulting gas mixture is swept across the surface of the reaction mixture in the flask. After 7 hours and 15 minutes the reaction is shut down.

Gas chromatographic analysis indicates that of the dicyanobutanes produced 85.5% is adiponitrile. The number of cycles (mole ratio of dicyanobutanes produced to catalyst charged) is 37.

Example XLI

A 50 ml., three-neck, round bottom flask, fitted with a water cooled reflux condenser connected to a Dry Ice trap, an inlet, a thermometer and a magnetic stirrer, is cooled in an ice bath, and purged with nitrogen. The flask is charged with 4.98 g. (0.00383 mole) of Ni[P(OC$_6$H$_5$)$_3$]$_4$ 10.13 g. of P(OC$_6$H$_5$)$_3$ and 20.07 g. of 3-pentenenitrile. Diborane is passed into the stirred mixture at 4–8° C. at a rate of 5 ml. per minute for 12 minutes. The flask is then allowed to come to room temperature after which it is set up in an oil bath at 112° C., which is then maintained at 111° C. to 125° C. A stream of nitrogen gas at a rate of 20 ml. per minute is bubbled through liquid hydrogen cyanide contained in a 20 ml. flask cooled in an ice bath. The resulting gas mixture is swept across the surface of the reaction mixture in the flask. After 4 hours 7 ml. (as measured in liquid form at 0° C.) has been fed to the flask and the reaction is shut down. The flask is filled with nitrogen gas and allowed to stand over a weekend at room temperature. After this time the oil bath is again heated to 111–125° C. and the nitrogen/hydrogen cyanide gas feed resumed at the same rate for an additional 2 hours and 45 minutes, at which time the reaction is shut down.

Gas chromatographic analysis indicates 68% of the 3-pentenenitrile is converted to dinitriles and that of the 3-pentenenitrile so converted 88.3% is adiponitrile, 9.9% is 2-methylglutaronitrile and 1.9% is ethylsuccinonitrile. The number of cycles (mole ratio or dicyanobutanes produced to catalyst charged) is 44.

Example XLII

A 50 ml., three-neck, round bottom flask, fitted with a reflux condenser connected to a Dry Ice trap, is set up in an oil bath maintained at 40° C., and purged with nitrogen. The flask is charged with 0.430 g. (0.0003 mole) of Ni[P(OC$_6$H$_5$)$_3$]$_4$, 0.131 g. (0.0003 mole) of

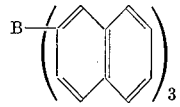

1.0 g. (0.003 mole) of P(OC$_6$H$_5$CH$_3$)$_3$ and 20 g. (0.25 mole) of 3-pentenenitrile. A stream of nitrogen gas is bubbled through liquid hydrogen cyanide contained in an ice bath. The resulting gas mixture is swept across the surface of the reaction mixture in the flask. After the reaction appears to have stopped the reaction is shut down.

Gas chromatographic analysis indicates that of the dicyanobutanes produced 94% is adiponitrile. The number of cycles (mole ratio of dicyanobutanes produced to catalyst charged) is 23.

Example XLIII

A 50 ml., three-neck, round bottom flask, fitted with a reflux condenser connected to a Dry Ice trap, an inlet, a thermometer and a magnetic stirrer, is set up in an oil bath maintained at 80° C., and purged with nitrogen. The flask is charged with 0.650 g. (0.0005 mole) of Ni[P(OC$_6$H$_5$)$_3$]$_4$, 0.368 g. (0.001 mole) of

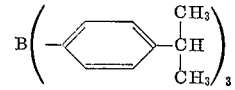

3.1 g. (0.01 mole) of P(OC$_6$H$_5$)$_3$ and 20.0 g. (0.25 mole) of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. After 4 or 5 hours the reaction appears to be completed. After 30 hours the reaction is shut down.

Gas chromatographic analysis indicates that of the dicyanobutanes produced 79% is adiponitrile. The number of cycles (mole ratio of dicyanobutanes produced to catalyst charged) is 29.

Example XLIV

A 50 ml., three-neck, round bottom flask, fitted with a reflux condenser connected to a Dry Ice trap, an inlet, a thermometer and a magnetic stirrer, is set up in an oil bath maintained at 80° C. and purged with nitrogen. The flask is charged with 0.650 g. (0.0005 mole) of Ni[P(OC$_6$H$_5$)$_3$]$_4$, 0.242 g. (0.001 mole) of B(C$_6$H$_5$)$_3$, 3.1 g. (0.01 mole) of P(OC$_6$H$_5$)$_3$, 5.4 g. of veratrole (1,2-dimethoxybenzene) and 15 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. After 22 hours the reaction is shut down.

Gas chromatographic analysis indicates that of the dicyanobutanes produced 95.5% is adiponitrile. The number of cycles is 64.

Example XLV

A 50 ml., three-neck, round bottom flask fitted with a water cooled reflux condenser connected to a Dry Ice trap, an inlet and a magnetic stirrer, is set up in an oil bath maintained at 120° C. The flask is purged with nitrogen gas and charged with 1.26 g. of Ni[P(OC$_6$H$_6$)$_3$]$_4$, 1.56 g. of (C$_6$H$_5$O)$_3$PBH$_3$, 9.3 g. of P(OC$_6$H$_5$)$_3$ and 20 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. After 6 hours the reaction is shut down.

Gas chromatographic analysis indicates that of the dicyanobutanes produced 88.0% is adiponitrile. The number of cycles (mole ratio of dicyanobutanes produced to nickel catalyst charged) is 76.

Example XLVI

A 50 ml., three-neck, round bottom flask fitted with a water cooled reflux condenser connected to a Dry Ice trap, an inlet and a magnetic stirrer, is set up in an oil bath maintained at 120° C. The flask is purged with nitrogen gas and charged with 0.6 g. of $Ni[P(OC_6H_5)_3]_4$, 1.50 g. of $(C_6H_5O)_3PBH_3$, 9.3 g. of $P(OC_6H_5)_3$ and 20 g. (0.25 mole) of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. After 1 hour and 30 minutes the reaction is shut down.

Gas chromatographic analysis indicates that of the dicyanobutanes produced 85.3% is adiponitrile. The number of cycles (mole ratio of dicyanobutanes produced to nickel catalyst charged) is 40.

Example XLVII

A 50 ml., three-neck, round bottom flask fitted with a water cooled reflux condenser connected to a Dry Ice trap, an inlet and a magnetic stirrer, is set up in an oil bath maintained at 120° C. The flask is purged with nitrogen gas and charged with 1.25 g. of $Ni[P(OC_6H_5)_3]_4$, 0.90 g. of $(C_6H_5O)_3PBH_3$, 10 g. of $P(OC_6H_5)_3$ and 20 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. After 3 hours and 30 minutes the reaction is shut down.

Gas chromatographic analysis indicates that of the dicyanobutanes produced 87.5% is adiponitrile. The number of cycles (mole ratio of dicyanobutanes produced to nickel catalyst charged) is 40.

Example XLVIII

A 50 ml., three-neck, round bottom flask fitted with a water cooled reflux condenser connected to a Dry Ice trap, an inlet and a magnetic stirrer, is set up in an oil bath maintained at 120° C. The flask is purged with nitrogen gas and charged with 2.51 g. of $Ni[P(OC_6H_5)_3]_4$, 1.23 g. of $(C_2H_5O)_3PBH_3$, 10 g. of $P(OC_6H_5)_3$ and 20 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. After 6 hours the reaction is shut down.

Gas chromatographic analysis indicates that of the dicyanobutanes produced 88.2% is adiponitrile. The number of cycles (mole ratio of dicyanobutanes produced to nickel catalyst charged) is 49.

Example XLIX

A 50 ml., three-neck, round bottom flask fitted with a water cooled reflux condenser connected to a Dry Ice trap, an inlet and a magnetic stirrer, is set up in an oil bath maintained at 120° C. The flask is purged with nitrogen gas and charged with 4.96 g. of $Ni[P(OC_6H_5)_3]_4$, 1.23 g. of $(C_6H_5O)_3PBH_3$, 10 g. of $P(OC_6H_5)_3$ and 28.3 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. After 5 hours the reaction is shut down.

Gas chromatographic analysis indicates that of the dicyanobutanes produced 88.2% is adiponitrile. The number of cycles (mole ratio of dicyanobutanes produced to nickel catalyst charged) is 35.

What is claimed is:

1. A process of hydrocyanating a non-conjugated ethylenic carbon-carbon double bond in an organic compound selected from the class consisting of olefins and cyano-substituted olefins which organic compound contains from 2 to 20 carbon atoms comprising contacting said organic compound with hydrogen cyanide in the presence of a nickel compound of the structure $Ni[M(XYZ)]_4(CO)_{4-x}$ where $x$ is a number of from 0 to 2 wherein M is selected from the class consisting of P, As, and Sb and wherein X, Y and Z are selected from the class consisting of R and OR wherein R is selected from the class consisting of alkyl and aryl groups having up to 18 carbon atoms, and a boron compound selected from the class consiting of alkali metal and tetra (lower alkyl) ammonium borohydrides, borohydrides of the structure $B_nH_{n+4}$ wherein $n$ is an integer of from 2 to 10 and $B_mH_{m+6}$ wherein $m$ is an integer of from 4 to 10 and organo boron compounds of the formula $B(R')_3$ wherein $R'$ is selected from the class consisting of aryl radicals of from 6 to 18 carbon atoms, lower alkyl radicals and cyano substituted lower alkyl radicals, which nickel compound is present in a molar ratio of from about 5:1 to 1:2000 as based on said organic compound, which boron compound is present in a molar ratio of from about 1:16 to 50:1 as based on the nickel complex, at a temperature of from about —25 to 200° C.

2. The process of claim 1 wherein $x$ is 0.

3. The process of claim 2 wherein the unsaturated organic compound is selected from the class consisting of 3-pentenenitrile and 4-pentenenitrile and the principal product is adiponitrile.

4. The process of claim 3 wherein the molar ratio of nickel compound to 3-pentenenitrile and 4-pentenenitrile is from about 1:10 to 1:2000.

5. The process of claim 4 wherein the temperature used is from 0° C. to 150° C. and the hydrogen cyanide is swept across the surface of or bubbled through the reaction mixture.

6. The process of claim 5 wherein X, Y and Z are OR.

7. The process of claim 6 wherein R is aryl.

8. The process of claim 7 wherein M is P.

9. The process of claim 8 wherein R is selected from the class consisting of

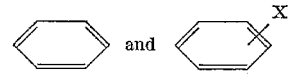

wherein X is selected from the class consisting of Cl, $OCH_3$, and $CH_3$.

10. The process of claim 9 wherein the boron compound is selected from the class consisting of alkali metal and tetra (lower alkyl) ammonium borohydrides.

11. The process of claim 9 wherein the boron compound has the structure $B_nH_{n+4}$ wherein $n$ is an integer of from 2 to 10.

12. The process of claim 9 wherein the boron compound has the structure $B_mH_{m+6}$ wherein $m$ is an integer of from 4 to 10.

13. The process of claim 9 wherein the boron compound is an organo boron compound of the structure $B(R')_3$.

14. The process of claim 10 wherein the borohydride is sodium borohydride.

15. The process of claim 10 wherein the borohydride is potassium borohydride.

16. The process of claim 12 wherein $R'$ is aryl.

17. The process of claim 16 wherein $R'$ has the structure

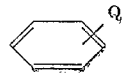

wherein Q is selected from the class consisting of H, F, and CF$_3$.

References Cited

UNITED STATES PATENTS

| | | | |
|---|---|---|---|
| 3,243,468 | 3/1966 | Clark et al. | 252—431 |
| 3,278,575 | 10/1966 | Davis et al. | 260—465.3 |
| 3,282,981 | 11/1966 | Davis | 260—465.3 |
| 3,297,742 | 1/1967 | Monroe et al. | 260—465.3 |
| 3,328,443 | 6/1967 | Clark et al. | 252—431 |

CHARLES B. PARKER, Primary Examiner

S. T. LAWRENCE III, Assistant Examiner

U.S. Cl. X.R.

260—464, 465, 465.1, 465.3, 465.9

PO-1050
(5/69)

UNITED STATES PATENT OFFICE
CERTIFICATE OF CORRECTION

Patent No. 3,496,218     Dated February 17, 1970

Inventor(s) William Charles Drinkard, Jr.

It is certified that error appears in the above-identified patent and that said Letters Patent are hereby corrected as shown below:

Column 3, line 48; "The" should be "This".

Column 4, line 39; "$B_nH_{n+1}$" should be "$B_nH_{n+4}$".

Column 6, line 16; "20°" should be "2°";

line 24; after "of" insert "-3-pentenenitrile and 0.2 g. of sodium borohydride is-".

Column 9, line 16; "122.9" should be "122.0";

line 25; "9.25" should be "0.25".

Table III, 3rd line, 3rd column; "5.62" should be "4.62".

Column 14, line 54; delete duplicate "is".

Column 15, line 40, formula should be "$Ni[P(OC_6H_5)_3]_4$";

line 58, "purger" should be "purged."

line 59, "mloe" should be "mole".

Column 16, line 10; "0.324" should be "0.325".

line 27; "75.2%" should be "75.3%".

Column 18, line 12, formula should be "$P(OC_6H_4CH_3)_3$";

line 71, formula should be "$Ni[P(OC_6H_5)_3]_4$".

Column 19, line 13, "1.50" should be "1.56".

Claim 1, line 8, formula should be "$Ni[M(XYZ)]_{4-x}(CO)_x$".

Claim 11, should read "The process of Claim 10".

Claim 12, should read "The process of Claim 10".

Claim 13, should read "The process of Claim 10".

(SEAL)
Attest:

SIGNED AND SEALED

SEP 29 1970

Edward M. Fletcher, Jr.
Attesting Officer

WILLIAM E. SCHUYLER, JR.
Commissioner of Patents